US010792770B1

(12) United States Patent
Cleghorn et al.

(10) Patent No.: US 10,792,770 B1
(45) Date of Patent: Oct. 6, 2020

(54) VACUUM CHUCK SYSTEM FOR A WELD TOOL

(71) Applicants: Geocent, LLC, Metairie, LA (US); The USA as represented by Administrator of NASA, Huntsville, AL (US)

(72) Inventors: Damon Max Hollis Cleghorn, Huntsville, AL (US); Justin Anderson Littell, Huntsville, AL (US)

( * ) Notice: Subject to any disclaimer, the term of this patent is extended or adjusted under 35 U.S.C. 154(b) by 138 days.

(21) Appl. No.: 16/204,962

(22) Filed: Nov. 29, 2018

Related U.S. Application Data

(60) Provisional application No. 62/591,852, filed on Nov. 29, 2017.

(51) Int. Cl.
*B23K 37/00* (2006.01)
*B23K 37/04* (2006.01)
*B23B 31/30* (2006.01)
*B23K 20/12* (2006.01)

(52) U.S. Cl.
CPC ............ *B23K 37/04* (2013.01); *B23B 31/307* (2013.01); *B23K 20/1295* (2013.01)

(58) Field of Classification Search
CPC ...... B23K 37/04–0461; B23K 20/1295; B23K 20/122–128; B23B 31/307
USPC ........... 228/112.1–114.5, 2.1–2.3, 44.3–44.7, 228/47.1–49.6, 212–213
See application file for complete search history.

(56) References Cited

U.S. PATENT DOCUMENTS

| | | | |
|---|---|---|---|
| 2,311,525 A * | 2/1943 | Ebbs ................. | B23K 37/0435 269/21 |
| 3,833,230 A * | 9/1974 | Noll ..................... | B23B 31/307 279/3 |
| 4,603,867 A * | 8/1986 | Babb ..................... | B23B 31/307 264/DIG. 78 |
| 4,752,181 A * | 6/1988 | Klingler ................ | B23B 31/307 294/185 |
| 7,416,102 B1 * | 8/2008 | Trapp .................. | B23K 20/1225 228/112.1 |
| 8,365,386 B2 * | 2/2013 | Vontz ................... | B25J 15/0052 228/212 |
| 2002/0179682 A1 * | 12/2002 | Schilling ............... | B23K 20/127 228/112.1 |
| 2007/0119906 A1 * | 5/2007 | Mika ................... | B23K 20/1245 228/112.1 |
| 2010/0038832 A1 * | 2/2010 | Rosal .................. | B23K 20/1255 266/46 |
| 2012/0181324 A1 * | 7/2012 | Yamauchi ............ | B23K 20/124 228/114 |
| 2012/0279441 A1 * | 11/2012 | Creehan ................. | C23C 24/06 118/76 |

(Continued)

FOREIGN PATENT DOCUMENTS

DE    102006055286 A1 *  5/2008  .......... B23K 20/126
JP       2009178760 A  *  8/2009

(Continued)

*Primary Examiner* — Kiley S Stoner
(74) *Attorney, Agent, or Firm* — Andrew G. Vicknair

(57) ABSTRACT

A specialized vacuum chuck system of the present invention is capable of securing an object to a specialized welding tool in order to ensure that the object remains in a proper positional relationship with the welding tool. The system may also use springs and load stops to ensure that a proper load in maintained so the chuck base is not pulled off the object.

19 Claims, 12 Drawing Sheets

(56) References Cited

U.S. PATENT DOCUMENTS

| | | | | |
|---|---|---|---|---|
| 2013/0004234 | A1* | 1/2013 | Christ | B23K 20/2275 |
| | | | | 403/265 |
| 2013/0255453 | A1* | 10/2013 | Buck | B23B 31/307 |
| | | | | 82/1.11 |
| 2017/0304935 | A1* | 10/2017 | Okada | B23K 20/24 |
| 2018/0043420 | A1* | 2/2018 | Handwerker | B23K 20/127 |
| 2018/0073532 | A1* | 3/2018 | Whalen | F16B 5/08 |
| 2018/0200868 | A1* | 7/2018 | Ross | B23B 31/307 |

FOREIGN PATENT DOCUMENTS

| | | | | | |
|---|---|---|---|---|---|
| JP | 2009190040 | A | * | 8/2009 | |
| KR | 20090106567 | A | * | 10/2009 | |
| WO | WO-2008034563 | A1 | * | 3/2008 | B23K 35/0288 |
| WO | WO-2013143081 | A1 | * | 10/2013 | H01L 21/6838 |

* cited by examiner

VACUUM CHUCK SYSTEM FOR A WELD TOOL

CROSS REFERENCE TO RELATED APPLICATIONS

This application claims the benefit of U.S. provisional patent application Ser. No. 69/591,852 filed on Nov. 29, 2017.

GOVERNMENT LICENSE RIGHTS

This invention was made with government support under Contract NNM12AA41C awarded by NASA. The government has certain rights in the invention.

TECHNICAL FIELD

The present invention relates, in general to chucks, and more particularly to a vacuum chuck system for a weld tool.

BACKGROUND OF INVENTION

Currently, friction pull plug welding is a welding process where there is a small rotating part (plug) that is being spun and simultaneously pulled (forged) into a larger part and can be used for a variety of applications. Plug welding is another welding application that is advantageous as it can be used to fasten two pieces of metal together with a strong weld. Usually, a friction plug is rotated at high speeds and as it is rotated the plug is put into contact with the hole of the material to be plugged. Friction created by the rotating plug raises the temperature to a point in which the material flows plastically. The plug is then pulled which welds the plug into the hole in the material.

Friction pull plug welding is used for many large scale fabrication projects in the aerospace industry, such as use on large scale rocket parts such as various components of the NASA Space Launch System (SLS). NASA also uses its large scale plug weld tool (PWT) to assist in the welding and fabrication of the large scale rockets and different components. For the large scale welding to operate, a positive load is needed. In addition, to ensure the quality of the friction pull plug weld, the positional relationship between the working surface of the rocket and the plug welder has to be maintained. This relationship is difficult to maintain which results in oversized holes when drilling and welding issues, such as the plug being pulled into improper depths during welding.

Accordingly, a need exists in the art for a system capable of holding tooling to parts in a proper location when being worked on to ensure quality results. For example, there is a need for maintaining both a proper clamp load and the positional relationship between the working surface of the rocket and the plug welder so that quality welding and drilling is possible.

BRIEF SUMMARY OF THE INVENTION

The present invention is directed to a specialized vacuum chuck system for securing an object to a specialized welding tool in order to ensure that the object remains in a proper positional relationship with the welding tool. In maintaining the proper positional relationship, the welding tool is able to produce quality drilled holes and quality friction welds.

According to one embodiment of the present invention, the chuck system includes a base member, a brace plate and a vacuum area where a vacuum force will be applied for sucking the welding hardware to the surface of the large object being worked on, such as a portion of a rocket to ensure proper location and operation during welding. The chuck system is also configured to line up or match the contour of the surface of the object worked on, such as the surface of a NASA rocket, and is able to maintain proper alignment during drilling and plug welding procedures. In addition, the chuck system may also be configured with a base member, a vacuum area, and sealing grooves in the base member and gaskets to be located in the sealing grooves of the base member. The chuck system may also include load rods, guide rods, hard stops, springs, and a brace plate.

The foregoing has outlined rather broadly the features and technical advantages of the present invention in order that the detailed description of the invention that follows may be better understood. Additional features and advantages of the invention will be described hereinafter, which form the subject of the invention. It should be appreciated that the conception and specific embodiment disclosed may be readily utilized as a basis for modifying or designing other structures for carrying out the same purposes of the present invention. It should also be realized that such equivalent constructions do not depart from the invention. The novel features which are believed to be characteristic of the invention, both as to its organization and method of operation, together with further objects and advantages will be better understood from the following description when considered in connection with the accompanying figure(s). It is to be expressly understood, however, that each of the figure(s) is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The present invention is directed to a chuck system and method of using the system. The system can be used as a vacuum chuck system that operates to maintain the proper positional relationship of large scale hardware at a localized welding tool during various processes. The proper positional relationship is maintained by the entire chuck system and the ability of the system to apply a vacuum/holding force to the large scale hardware which assists in keeping the large scale hardware properly positioned to the welding tool. In addition, the use of load rods, hard stops, and springs assist in applying the proper load which further ensures that the proper positional relationship is maintained between the large scale hardware and localized welding tool.

Referring now in more detail to the drawings, the present invention will now be described in more detail.

Figure 1A:
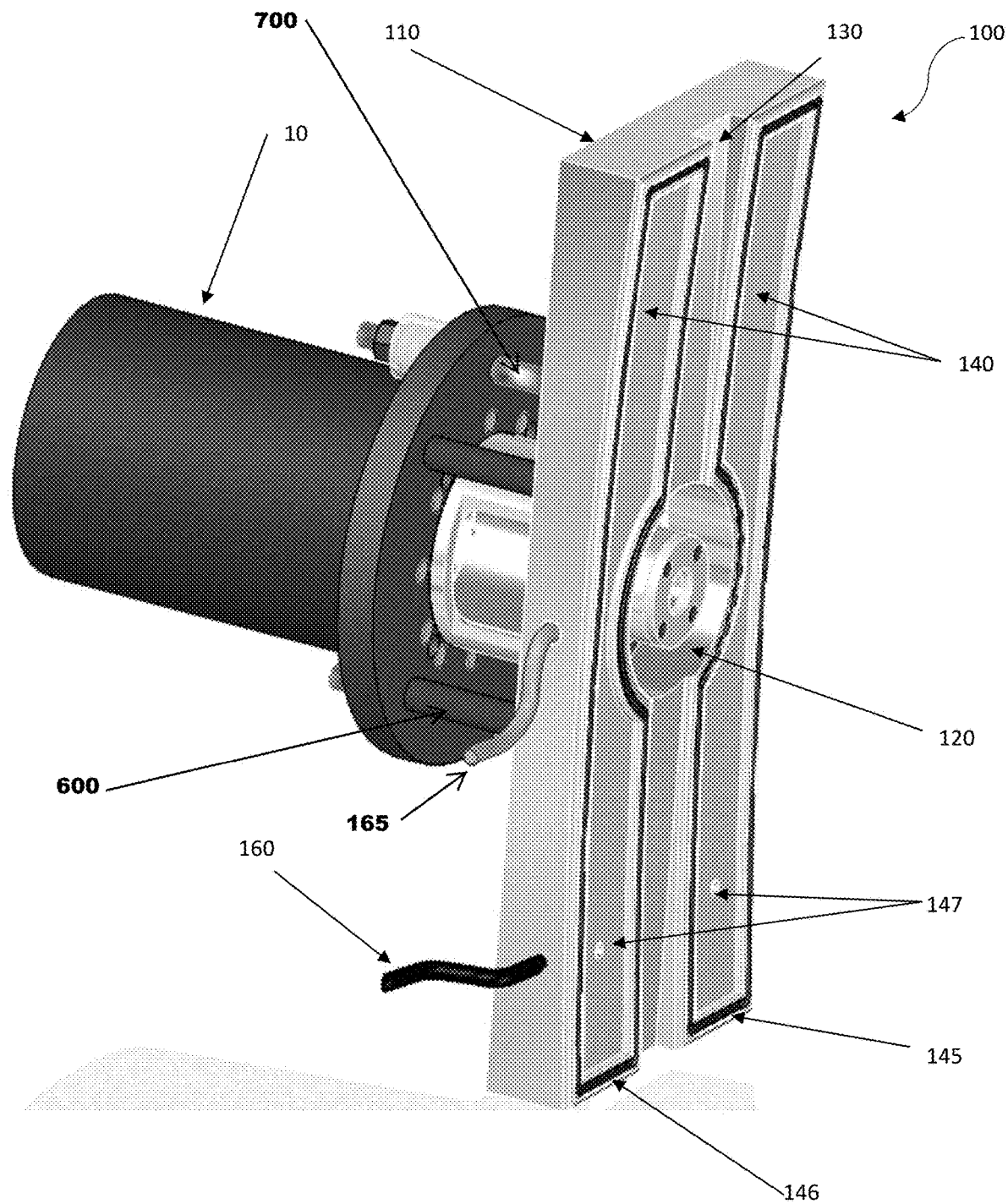
FIG. 1A is an illustration of a perspective view of an embodiment of the present invention in use.
Figure 1B:
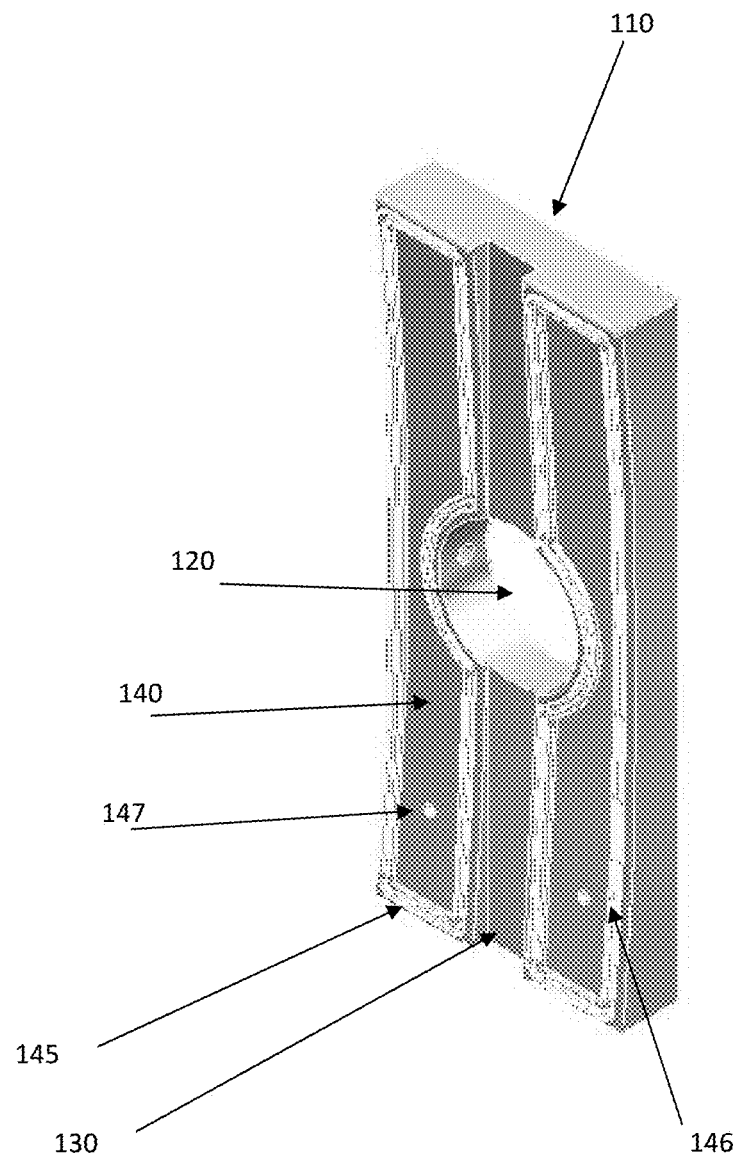
FIG. 1B is an illustration of a perspective view of a chuck base member of a portion of one embodiment of the present invention.

FIG. 1A illustrates a perspective view of the specialized vacuum chuck system 100 connected to a sample welding tool 10. FIG. 1A illustrates the configuration and arrangement of the specialized vacuum chuck system 100 to the large scale tooling such as welding tool 10 and illustrates how a portion of welding tool 10 is connected to vacuum chuck system 100. FIG. 1B illustrates a perspective view of base member 110 of specialized vacuum chuck system 100. The chuck base member 110 takes a rectangular shape with hole 120 located in the center. Hole 120 is configured to allow the tooling to protrude through hole 120 so that the tooling, such as welding tool 10, may be used with specialized vacuum chuck system 100. Base member 110 is configured with longitudinal slot 130 that extends the length of base member 110. In a preferred embodiment, base member 110 is made of aluminum, but in other embodiments, base member 110 may be made of different types of steel or other materials.

Slot 130 allows the specialized vacuum chuck system 100 of the present invention to be used with multiple tools such as different types of large scale welding tools. For instance, slot 130 allows the present invention to be used for both large scale friction pull plug welding processes and friction stir welding processes for large scale operations, such as welding operations on various portions of a rocket or other portions of the NASA space launch system (SLS). Slot 130 allows use in a friction stir weld process as slot 130 will line up with and go over the friction stir weld area and will line up parallel with the area of the two sections of parent material that are to be friction stir welded. Thus, slot 130 accounts for the possibility that the friction stir weld area may be higher than the parent material. So that if the friction stir weld area is higher than the parent material, slot 130 of the specialized vacuum chuck system 100 will go over the higher weld area insuring that the vacuum chuck system 100 will seat properly onto the material being welded.

Figure 2:
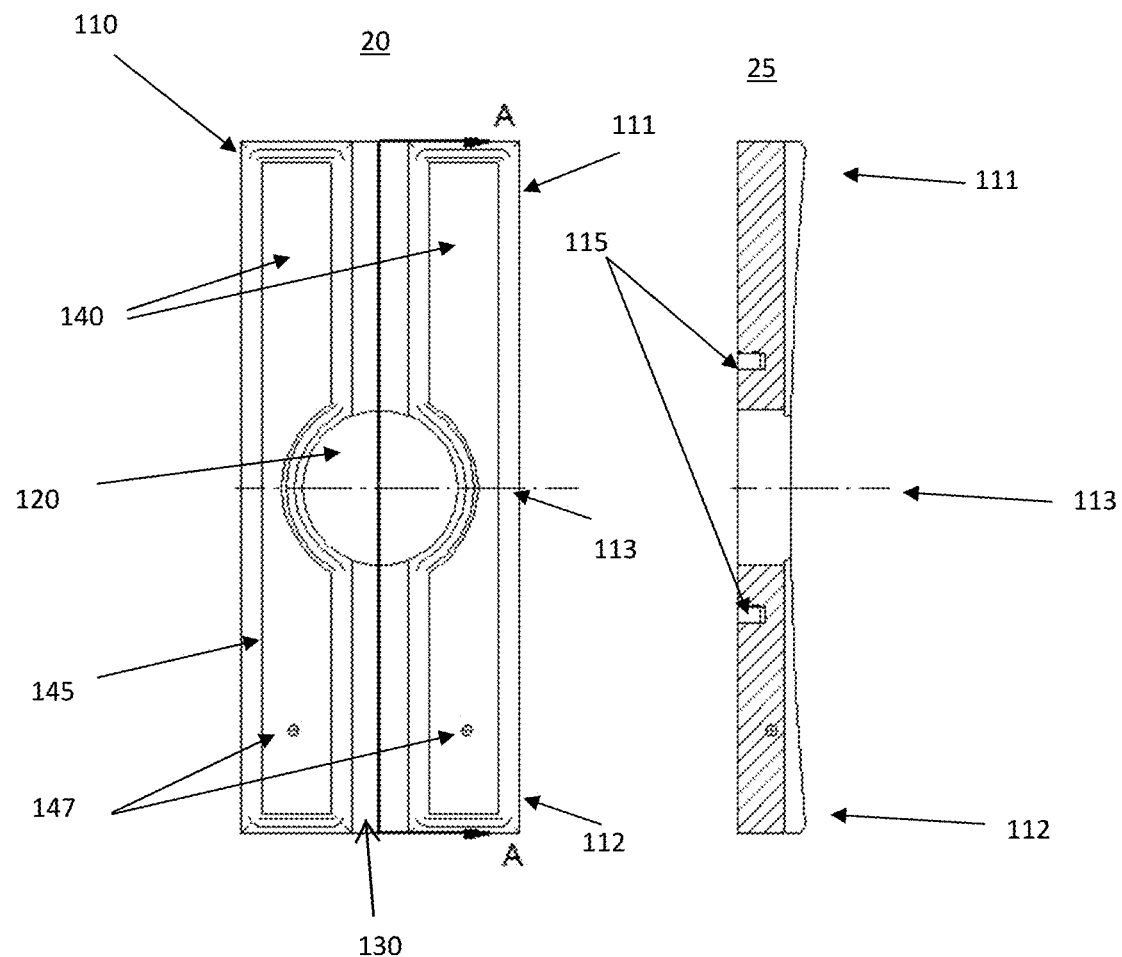
FIG. 2 is an illustration of an overhead and partial side view of the illustration of FIG. 1B.

As illustrated in FIGS. 1A, 1B and 2, base member 110 is also configured with vacuum areas 140 that are located on both sides of slot 130. Vacuum areas 140 are outlined by sealing grooves or notches 145. Sealing grooves 145 are a set of notches that outline both of the vacuum areas 140. As illustrated in FIGS. 1B and 3B, base member 110 is configured so that the sealing grooves 145 are shaped to route around hole 120 and are arranged as one continuous notch. Sealing grooves are configured to a certain depth that allows placement of a gasket 146 in sealing grooves 145. Gasket 146 helps seal the vacuum area 140 to assist in holding the specialized vacuum chuck system 100 to the large object being worked upon. Gasket 146 may be configured so that it is similar to an o-ring and may be made of elastomer or some other type of soft pliable material that allows base member 110 to be mashed up against the object being worked upon when the specialized vacuum chuck system 100 is in use. As further illustrated in FIGS. 1A, 1B and 2, the present invention is also configured in one embodiment with at least two vacuum holes 147, with one hole in each vacuum area 140. Vacuum holes 147 allow each vacuum area 140 to pull a vacuum so that only one vacuum hose connection 160 is required when the specialized vacuum chuck system 100 is in use. The vacuum force or holding force is created by a vacuum pump and a hose that is run into base member 110 through vacuum connection 160 as illustrated in FIGS. 1A and 10.

Figure 10:
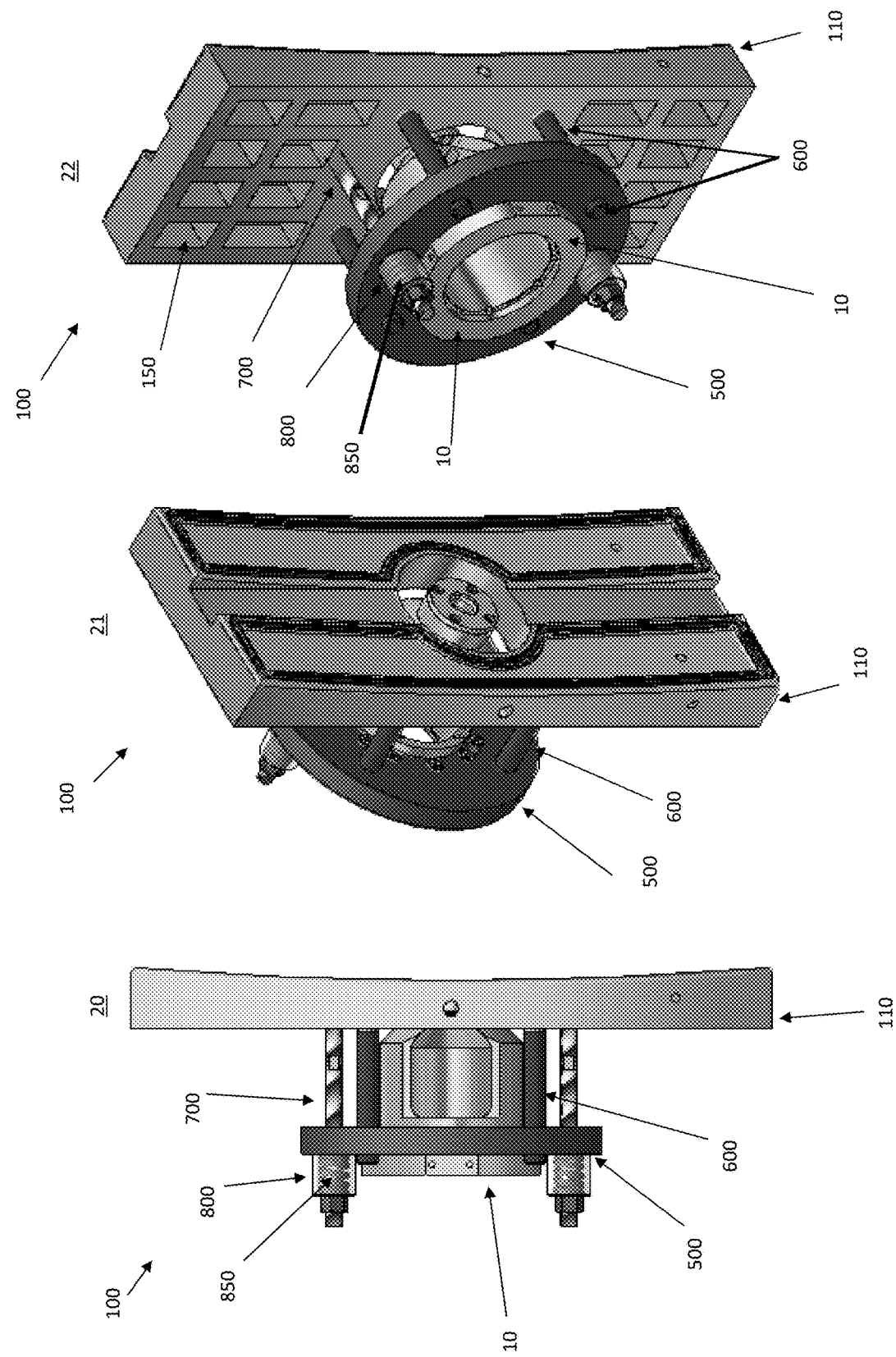
FIG. 10 is an illustrating of multiple perspective views of one embodiment of the present invention.

As shown in FIGS. 1A and 10, the present invention may also be configured so that base member 110 has two holes in the same side illustrated by vacuum hose connection 160 and purge hose 165. The holes are located where hoses 160 and 165 exit base member 110. The hole for a purge hose 165 is advantageous as it allows a user to purge the welding process using a gas, such as argon, to remove any oxidation before the weld process starts.

FIG. 2 is an illustration of an overhead view 20 of the front of base member 110 and a longitudinal cross-sectional view 25 of base member 110 of FIG. 1B. Similar to FIG. 1B, overhead view 20 of FIG. 2 illustrates base member 110, hole 120, slot 130, vacuum areas 140, and sealing grooves 145. Longitudinal cross-sectional view 25 illustrates a longitudinal cross-section of base member 110 along line A-A. Also illustrated in view 25 is guide bolt holes 115 that are configured to receive guide rods 600 further illustrated in FIG. 6. View 25 further illustrates that base member 110 is concave shaped. As illustrated in view 25, top distal end 111 and bottom distal end 112 both extend inward illustrating that base member 110 is concave shaped. In addition, top distal end 111 and bottom distal end 112 of base member 110 are thicker than the middle area 113 of base member 110 further illustrating the concave shape of base member 110. Base member 110 is concave shaped as it increases the ability of the specialized vacuum chuck system 100 to properly seat onto the material to be welded and to follow the shape of curved objects to be worked upon such as concave outer sections of a NASA rocket or NASA space launch system (SLS).

Figure 3A:
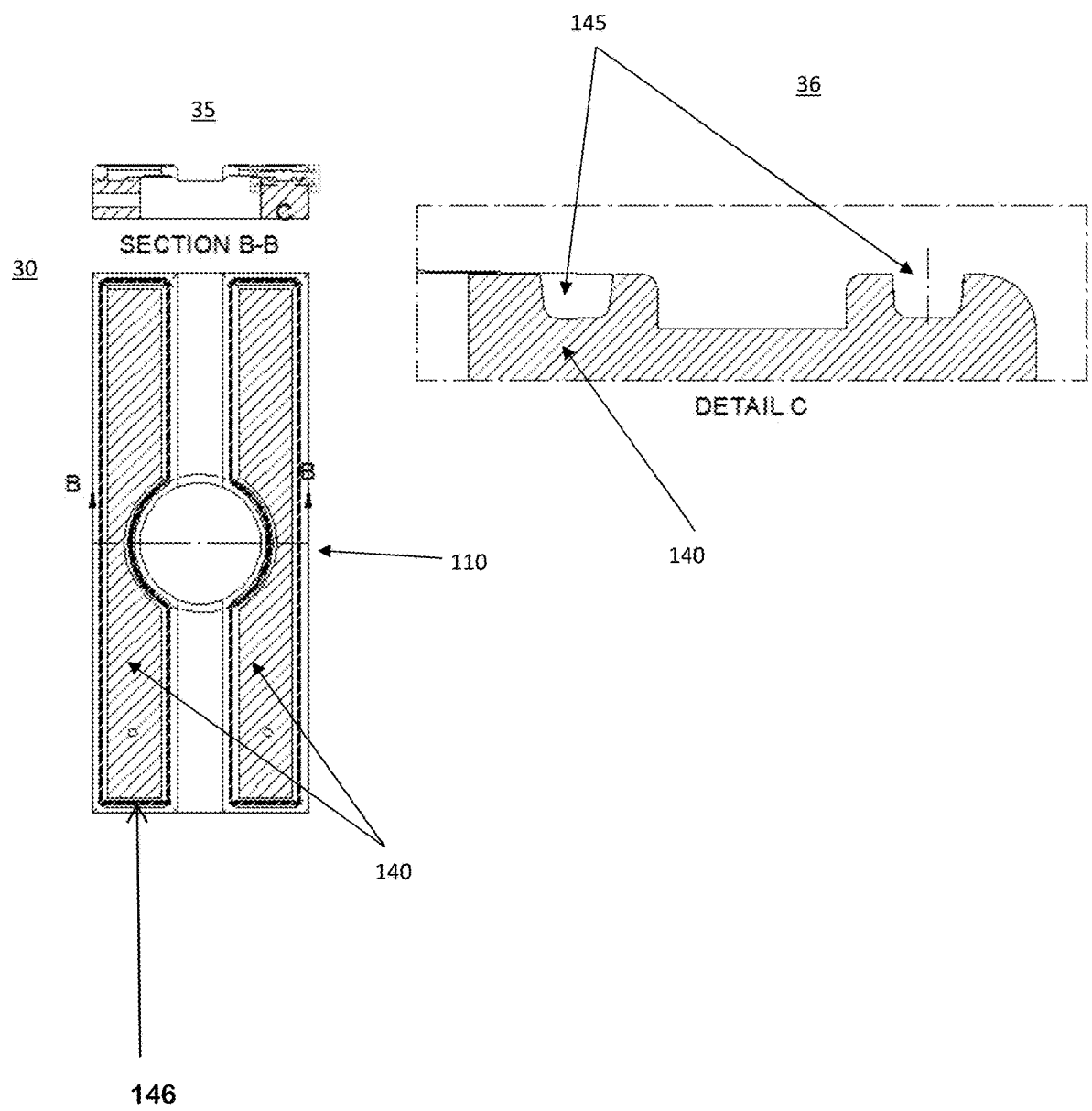
FIG. 3A is specialized view of the illustration of FIG. 1B.
Figure 3B:
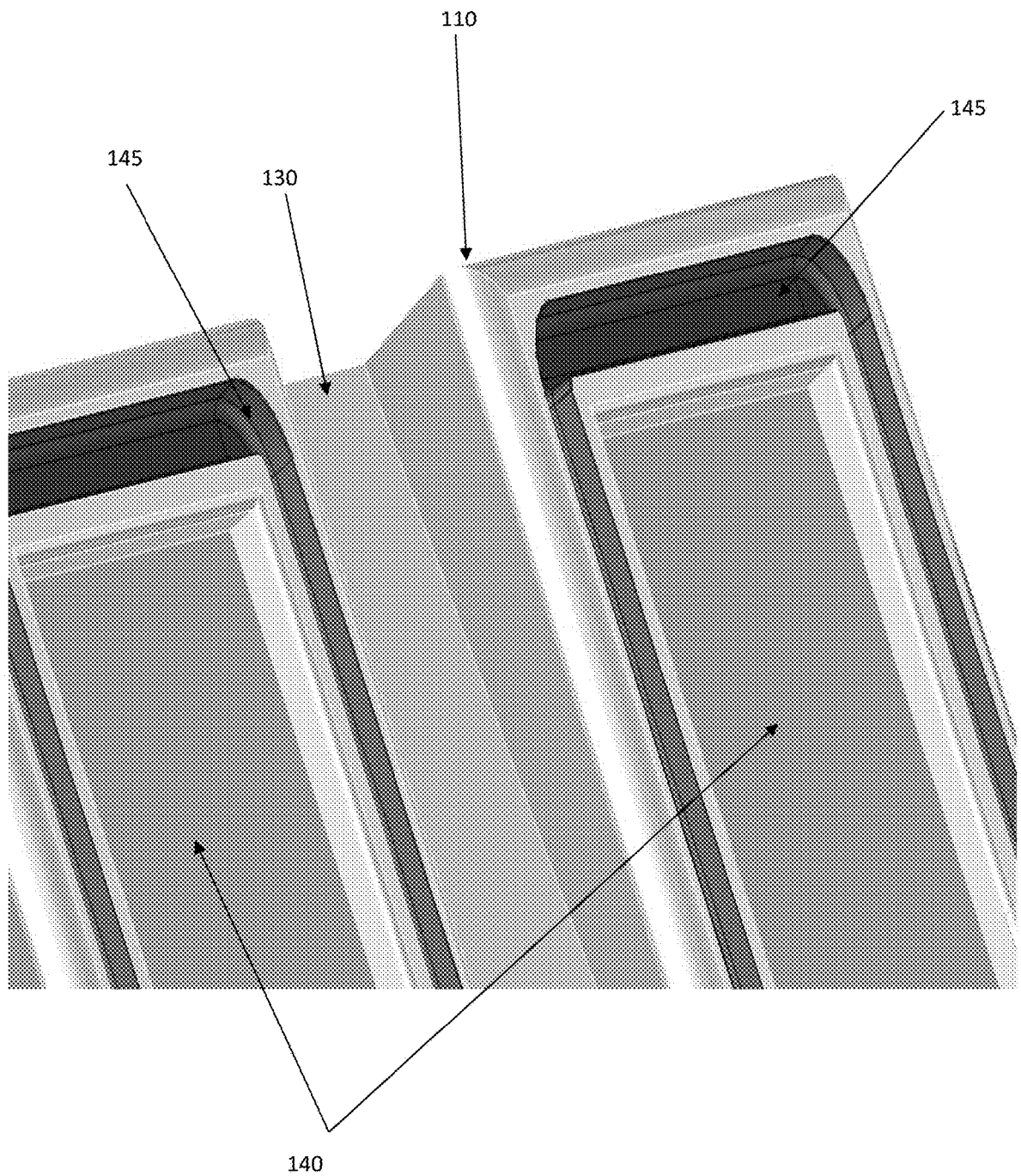
FIG. 3B is a close-up view of a portion of the illustration of FIG. 1B.

FIG. 3A is specialized view 30 of the illustration of FIG. 1B focusing on the vacuum areas 140. As shown in view 30 of FIG. 3A, vacuum areas 140 are an area of base member 110 that is sunken down into base member 110 as further illustrated in FIG. 1A. Vacuum areas 140 are surrounded by sealing grooves 145 and gasket 146. View 35 illustrates a cross-sectional view of base member 110 at line B-B in view 30. View 36 illustrates a close up view of area C of view 35. View 36 illustrates a close-up view of sealing grooves 145 and better illustrates how sealing grooves 145 are sunken into base member 110 to allow for gasket 146. In one embodiment, sealing grooves 145 are configured with rounded edges so that gasket 146, such as an o-ring or other rounded gasket, may be seated in sealing grooves 145.

FIG. 3B is a close-up view of vacuum areas 140 and sealing grooves 145. FIG. 3B clearly illustrates that sealing grooves 145 are sunken down into base member 110 and surround vacuum areas 140. Sealing grooves 145 are also configured so that gasket 146 can be placed into sealing grooves 145 to help create a seal when base member 110 is in use and pressed against the material being welded.

Figure 4:
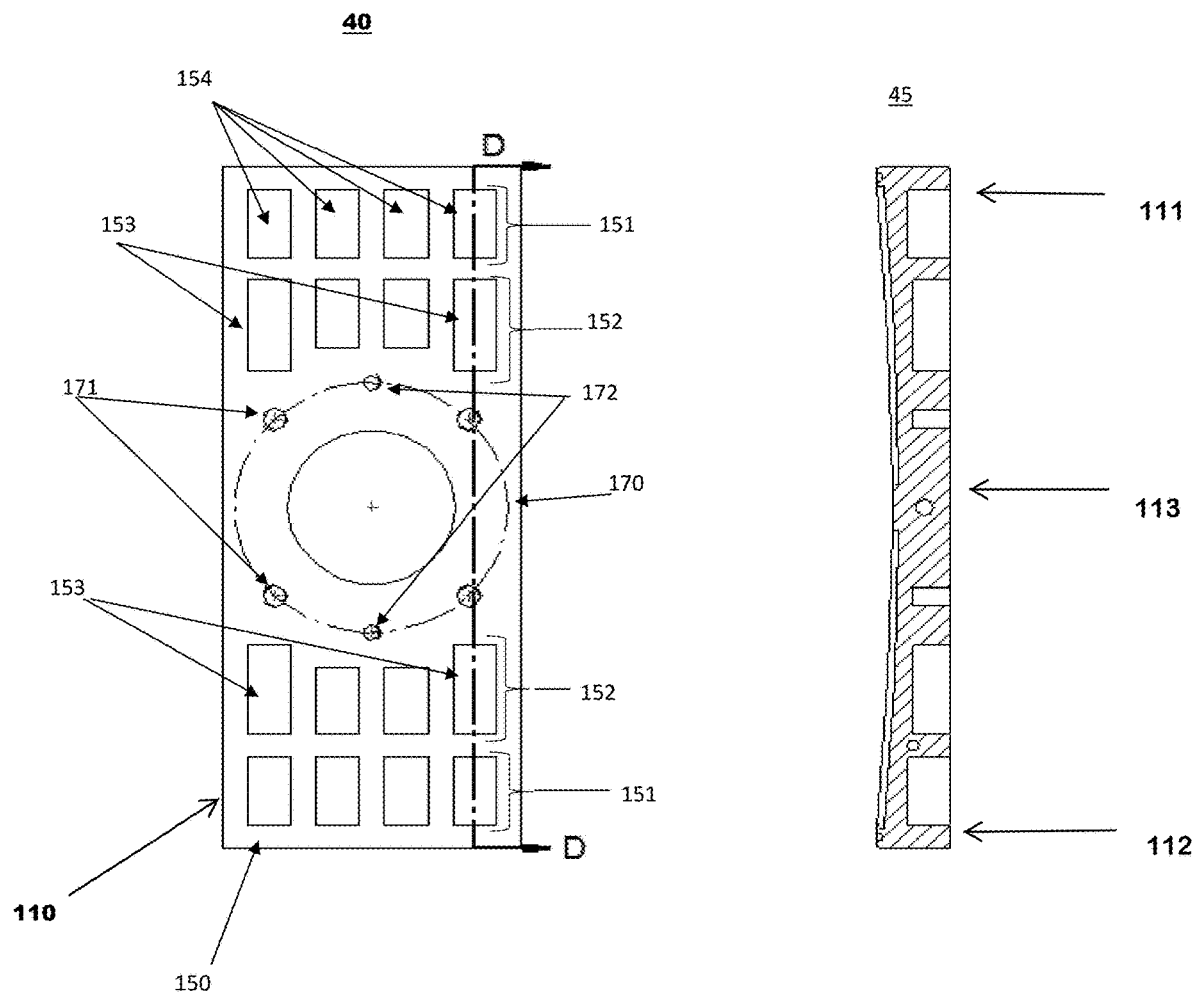
FIG. 4 is an illustration of a back view of the illustration of FIG. 1B.

FIG. 4 is an illustration of a top overhead view 40 of the back of base member 110 and longitudinal cross-sectional back view 45 of base member 110 of FIG. 1B. View 40 is the overhead view of the back of base member 110. As illustrated in FIG. 4, base member 110 is configured with a number of rectangular cut-outs 150. The cut-outs 150 operate to reduce the overall weight of base member 110 without compromising the ability of the specialized vacuum chuck system 100 to maintain a proper vacuum and hold the amount of force required to perform a plug weld operation.

In a preferred embodiment, cut-outs 150 are arranged as two outer rows 151 and two inner rows 152 for a total of four rows of cut-outs 150. Outer rows 151 are located near the outer edge of base member 110 and inner rows 152 are located closer to hole 120 than outer rows 151. In such an embodiment, cut-outs 150 may include four shallow cut-outs 153 that are located in inner rows 152 and twelve deep cut-outs 154. Shallow cut-outs 153 are not as deep as deep cut-outs 154. Because base member 110 is concave, top distal end 111 and bottom distal end 112 are thicker than the middle area 113 of base member 110. Thus, deep cut-outs 154 may be deeper in outer rows 151 than shallow cut-outs 153. However, to account for the fact that shallow cut-outs 153 are not as deep as deep cut-outs 154, shallow cut-outs 153 are configured so that they are longer than deep cut-outs 154. While the embodiment of FIG. 4 illustrates a total of sixteen cut-outs 150 arranged in four rows of four, the present invention is not limited to sixteen cut-outs arranged as four rows of four cut-outs 150 as other embodiments may be configured with more or less than sixteen cut-outs with the cut-outs 150 in different arrangements with either the same and/or different depths.

View 40 further illustrates that the back of base member 110 may be configured with a bolt pattern 170. In one embodiment, bolt pattern 170 is configured with six bolt holes including at least four larger holes 171 and at least two smaller holes 172. The bolt holes (two smaller 172 and four larger 171) in base member 110 are threaded and configured to receive certain rods some of which are for securing the brace plate 500 of FIG. 5 to base member 110. The larger bolt holes 171 may be configured to receive guide rods, such as the guide rod 600 of FIG. 6. The smaller bolt holes 172 may be configured to receive load rods, such as load rod 700 of FIG. 7.

Figure 5:
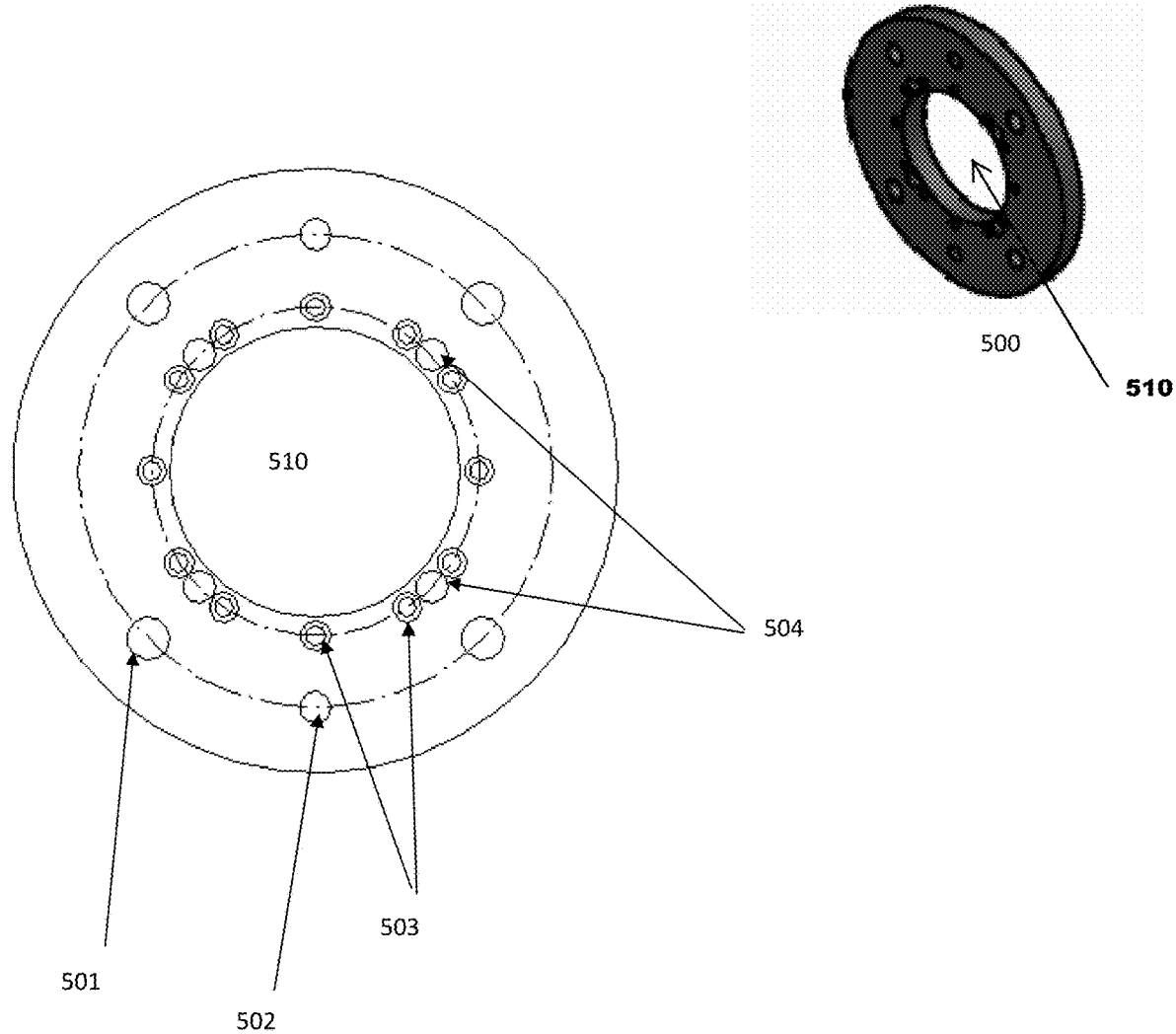
FIG. 5 is an illustration of a brace plate of the present invention.

FIG. 5 is an illustration of a brace plate 500 of the present invention. Brace plate 500 may be configured in the shape of a flange with a hole 510 located in the center of brace plate 500. Brace plate 500 operates to mount base member 110 to the welding tooling used with the present invention. The welding tool mounts to one side of brace plate 500 and base member 110 mounts on the other side of brace plate 500. Hole 510 allows a portion of the welding tool to extend through brace plate 500 and ultimately through hole 120 of base member 110 as illustrated in FIG. 1A. In one embodiment, brace plate 500 is configured with a series of six outer bolt holes including four larger holes 501 and two smaller holes 502. The larger holes 501 may be configured to line up with larger bolt holes 171 in base member 110 as illustrated in FIG. 4 and to receive guide rods, such as the guide rod 600 of FIG. 6. The smaller bolt holes 502 may be configured to line up with smaller bolt holes 172 in base member 110 as illustrated in FIG. 4 and also configured to receive load rods, such as load rod 700 of FIG. 7.

In addition to the outer bolt holes, brace plate 500 may be configured with a series of sixteen inner holes that surround hole 510. The sixteen inner holes include twelve smaller inner bolt holes 503 and four larger inner holes 504. The twelve smaller inner bolt holes 503 provide a location for a welding tool to mount to one side of brace plate 500. The four larger inner holes 504 provide clearance for bolts that are used to mount an anvil adaptor to the welding tool. Larger holes 504 also enable a user to remove such an anvil during operation so that the user does not have to remove the brace plate to remove the anvil. In one embodiment, brace plate 500 may be made of steel, but in other embodiments, brace plate 500 may be made of a different type of material.

Figure 6:
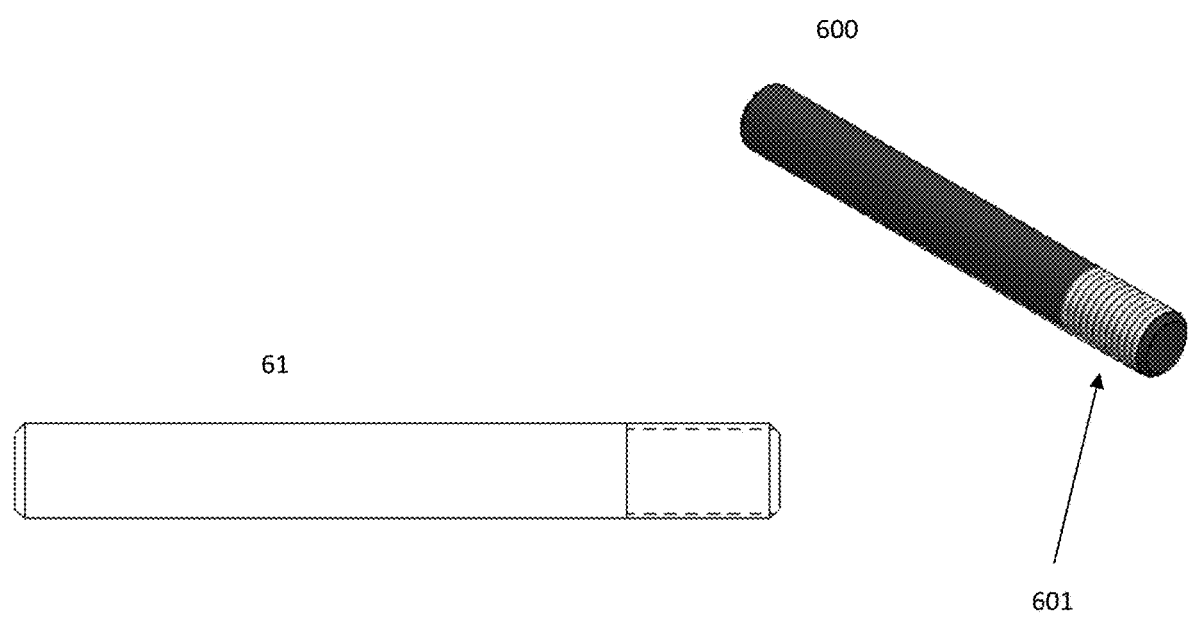
FIG. 6 is an illustration of a guide rod of the present invention.

FIG. 6 is an illustration of a guide rod 600 of the present invention and a side view 61 of guide rod 600. In one embodiment of the present invention at least four guide rods 600 are used. Guide rods 600 operate to allow base member 110 to slide or move back to brace plate 500 to allow for set up of the present invention prior to performing a weld. As illustrated in FIG. 6, guide rods 600 are configured with a threaded end 601. In one embodiment, guide rods 600 will pass through the four larger holes 501 of brace plate 500 and into the four larger holes 171 of base member 110. The threaded end 601 of guide rod 600 will screw into the four larger holes 171 of base member 110. In one embodiment of the present invention, guide rod 600 is configured so that it is long enough to screw into larger holes 171 of base member 110 and pass through and extend out of larger holes 501 of brace plate 500 as illustrated in FIG. 10.

Figure 7:
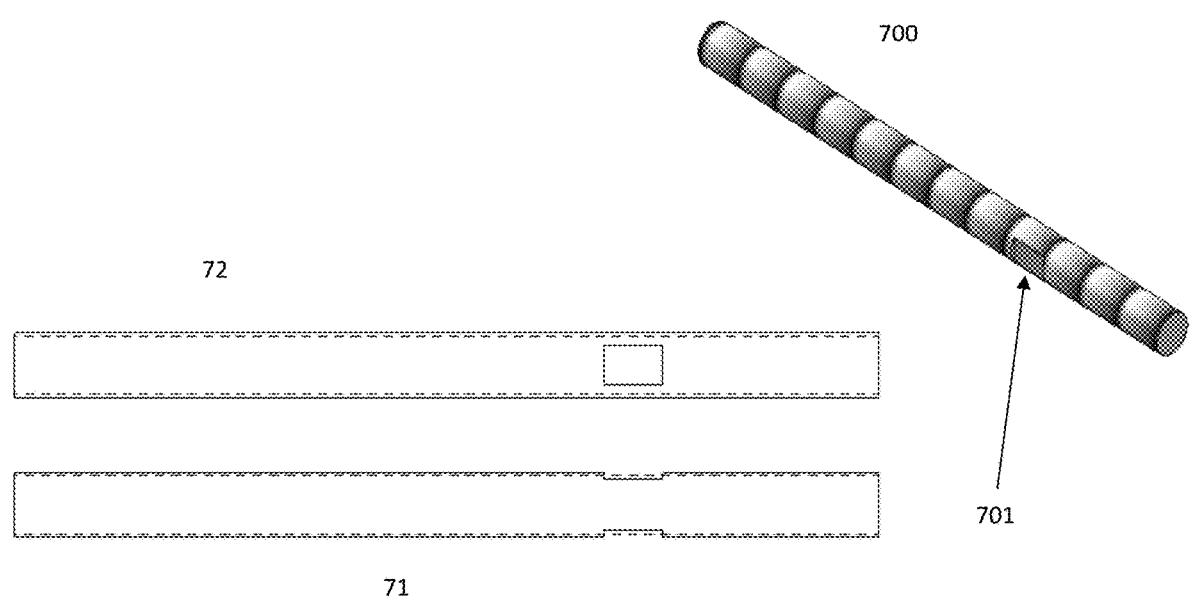
FIG. 7 is an illustration of a load rod of the present invention.

FIG. 7 is an illustration of a load rod 700 of the present invention and both an overhead view 71 and side view 72 of load rod 700. In one embodiment, load rod 700 is a threaded rod and may include wrench flats 701 for installation purposes. In one embodiment of the present invention, at least two load rods 700 are used. Load rods 700 are also configured to pass through the two smaller holes 502 of brace plate 500 and screw into the two smaller holes 172 of base member 110. Load rod 700 is configured so that when in use it is long enough to pass through and extend past brace plate 500 to such a length that it can accommodate hard stop 800, nut 910, and extends beyond both hard stop 800 and nut 910 when installed as illustrated in FIG. 10.

Figure 8:
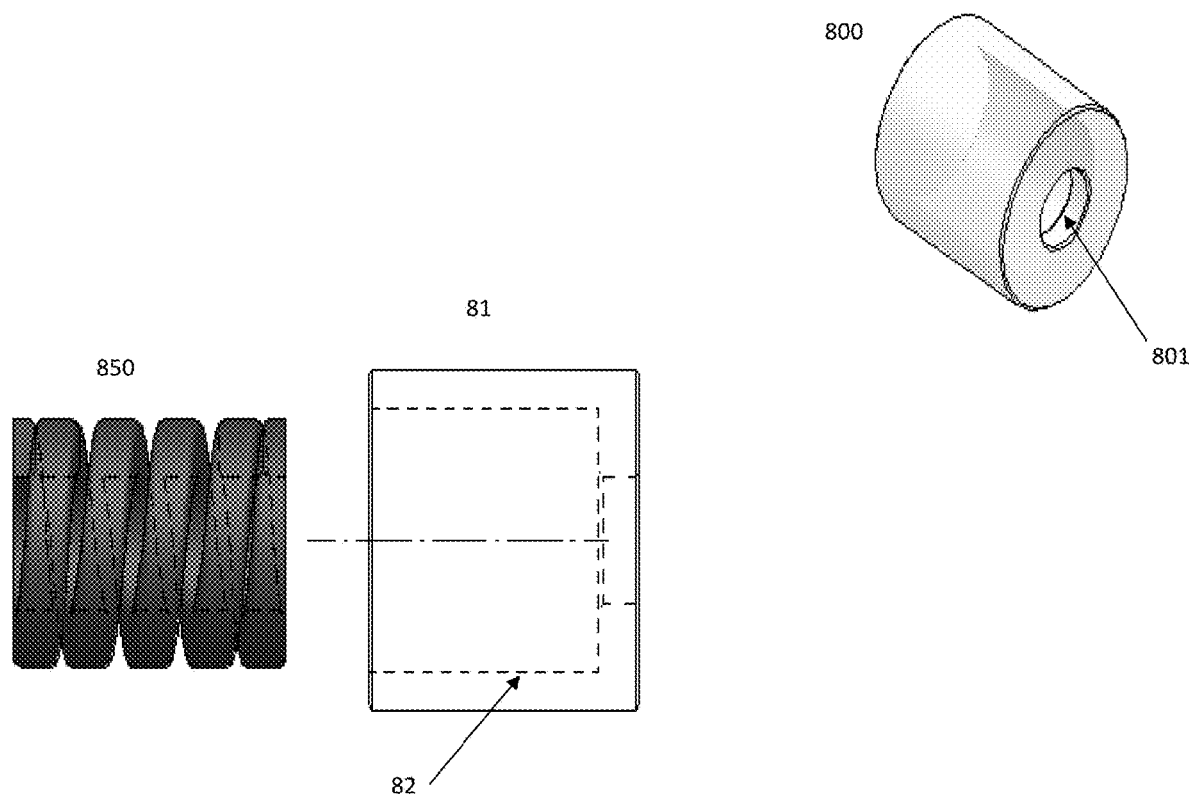
FIG. 8 is an illustration of a hard stop and spring of the present invention.
Figure 9:
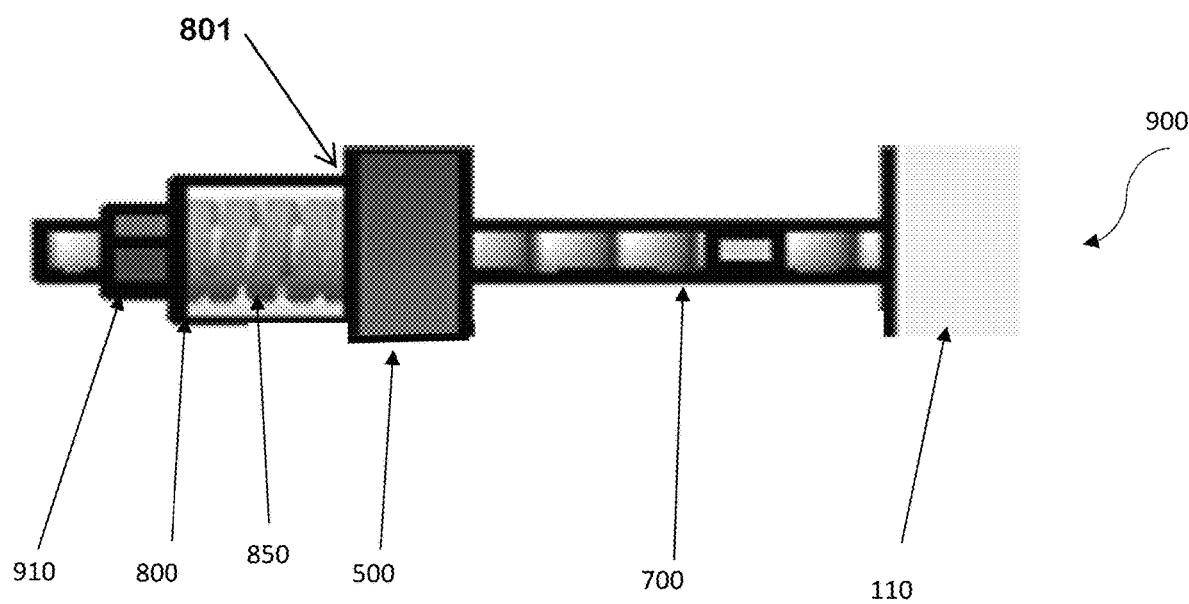
FIG. 9 is an illustration of a view of a load rod, brace plate, spring, and hard stop interconnected.

FIG. 8 an illustration of a hard stop 800, a side view 81 of hard stop 800, and a spring 850 of the present invention. Hard stop 800 is configured with a hole 801 located in the center of the cap of hard stop 800 and is hollow to allow hard stop 800 to be used with spring 850 and various screws, bolts, and rods that can slide into hard stop 800 and through hole 801. Side view 81 illustrates the depth of the hollow area by interior depth lines 82. These lines are for illustration purposes only. As illustrated in FIG. 8, spring 850 and hard stop 800 are sized so that hard stop 800 can fit over spring 850. Thus, hard stop 800 acts as a collar that is used with and slid over spring 850 and over and onto load rod 700 as illustrated in FIGS. 9 and 10. Hard stop 800 may be made of steel, but in other embodiments it may be comprised of other types of material.

In one embodiment, spring 850 is a heavy load chrome-silicon steel die spring with an overall length of 2 inches, a load of 571 lbs., and a rate of 1,904 lbs/inch. However, the present invention is not limited to the use of such a spring as other embodiments may use different types of springs.

FIG. 9 is a close-up view 900 of the load rod 700, spring 850, and hard stop 800 used with one another in the present invention. Load rod 700 will screw into smaller holes 172 on the back of base member 110, will extend out of base member 110 and pass through smaller holes 502 of brace plate 500 and extend out and beyond brace plate 500. As illustrated in FIG. 9, spring 850 is slid onto load rod 700. Hard stop 800 is then slid over load rod 700 through hole 801 and over and onto spring 850. Then, nut 910 is slid over load rod 700 and up against hard stop 800. A user is then able to tighten nut 910 which will cause hard stop 800 to move down upon spring 850. As hard stop 800 is moved down on spring 850, spring 850 will compress which in turn will increase the load or force applied to base member 110.

In particular, view 900 illustrates a view where nut 910 has already been tightened as the hard stop 800 is already in contact with brace plate 500. As illustrated in FIG. 9, hard stop 800 operates as a mechanical stop that will limit the travel of hard stop down upon spring 850. Thus, nut 910 can only be tightened down so much because hard stop 850 will eventually be pressed against brace plate 500 and at that point, nut 910 can no longer be tightened. Ultimately, hard stop 850 also limits the amount of force that can be applied to spring 850 and will thus limit the compression of spring 850 which in turn limits the force that can be applied to base member 110.

As illustrated in FIG. 9, load rod 700 operates in conjunction with hard stop 800 and spring 850 of FIG. 8 and all work together to provide a proper load or force to base member 110 so that base member 110 will remain aligned with the object being welding during both drilling and welding operations. In addition, these three components (rod 700, hard stop 800, and spring 850) also work to apply a proper load or force to enable base member 110 and vacuum areas 140 to maintain a vacuum so that base member 110 will stay up against the object being welded during welding and drilling operations.

FIG. 10 is an illustration of a three different perspective views of specialized vacuum chuck system 100. View 20 illustrates a side view of one embodiment of specialized vacuum chuck system 100 connected to a welding tool 10 without any hoses, connections, or tubes (such as vacuum connection 160 purge hose 165 of FIG. 1A) connected. From side view 20, the connection among brace plate 500, guide rods 600, load rod 700, hard stop 800, and spring 850 are illustrated.

View 21 illustrates a front perspective view of one embodiment of specialized vacuum chuck system 100 without any hoses, connections, or tubes connected. View 22 illustrates a back perspective of specialized vacuum chuck system 100 connected to a welding tool 10 without any hoses, connections, or tubes (such as vacuum connection 160 or purge hose 165 of FIG. 1A) connected. The back of base member 110 is clear along with rectangular cut-outs 150 along with the interconnections among brace plate 500, guide rods 600, load rods 700, hard stops 800, and springs 850

In one embodiment, as illustrated in view 21 of FIG. 10, a total of two load rods 700, two hard stops 800, and two springs 850 are used to apply force to obtain the desired load for use during welding and drilling operations. In addition, a total of four guide rods 600 are used to allow base member 110 to slide or move back to brace plate 500 to allow for set up prior to performing a weld.

Although the present invention and its advantages have been described in detail, it should be understood that various changes, substitutions and alterations can be made herein without departing from the invention. It should also be understood that the drawings are not to scale so that a description can be placed on illustrating the principles of the present invention. Similarly, any use of the terms "substantially" or "approximately" may be applied to modify any representation that could vary without resulting in a change in the basic function to which it is related. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized.

What is claimed is:

1. A chuck system comprising:
   at least four guide rods;
   at least two load rods;
   a concave shaped base member wherein said base member comprises:
      a top distal end;
      a bottom distal end;
      a middle area;
      a first hole located in a middle area of said base member;
      a longitudinal slot that runs from said first distal end to said second distal end;
      a first area for creating a vacuum;
      a second area for creating a vacuum;
      at least six holes for receiving said guide rods and said load rods;
   a brace plate member with a first hole located in the middle of said brace plate member;
   at least two stop members wherein said stop members comprise a cap with a hole in the top of each of said stop members; and
   at least two springs.

2. The chuck system of claim 1 wherein said concave shaped base member is the shape of a rectangle with a first distal end, a second distal end, and a middle area wherein said first distal end and said second distal end are thicker than said middle area.

3. The chuck system of claim 1 wherein said concave shaped base member further comprises a first groove surrounding said first vacuum area and a second groove surrounding said second area for creating a vacuum.

4. The chuck system of claim 3 wherein said concave shaped base member further comprises a first gasket located in said first groove surrounding said first vacuum area and a second gasket located in said second groove surrounding said first vacuum area.

5. The chuck system of claim 4 further comprising a second hole located in said first vacuum area and a third hole located in said second vacuum area.

6. The chuck system of claim 5 further comprising a fourth hole located in the side of said concave shaped base member wherein said fourth hole is configured to receive a means for creating a vacuum in said first vacuum area and said second vacuum area.

7. The chuck system of claim 6 further comprising a fifth hole located in the side of said concave shaped base member above said fourth hole wherein said fifth hole is configured to receive a hose.

8. The chuck system of claim 1 wherein said brace plate further comprises:
   a second and third hole sized to allow said at least two load rods to pass through said second and third hole; and
   a fourth, fifth, sixth and seventh hole sized to allow said at least four guide rods to pass through.

9. The chuck system of claim 1 wherein the back of said concave shaped base member includes a series of cut-outs.

10. The chuck system of claim 1 wherein said concave shaped base member is constructed of aluminum.

11. A chuck system for a weld tool comprising:
   at least four guide rods;
   at least two load rods;

a concave rectangular shaped base member wherein said
base member comprises:
  a front, a back, and two sides wherein said back
    includes a plurality of cut-outs to reduce the weight
    of said base member;
  a top distal end;
  a bottom distal end;
  a middle area;
  a first hole located in a middle area of said base member
    that extends through said base member;
  a longitudinal slot that runs from said first distal end to
    said second distal end;
  a first area for creating a vacuum wherein said first area
    is surrounded by a first groove in said base member;
  a second area for creating a vacuum wherein said
    second area is surrounded by a second groove in said
    base member;
  a second and third hole in said back of said base
    member for receiving said two load rods;
  a fourth, fifth, sixth, and seventh hole in said back of
    said base member for receiving said four guide rods;
a brace plate member with a first hole located in the
  middle of said brace plate member that extends through
  said brace plate wherein said brace plate includes at
  least two additional holes for allowing said load rods to
  pass through and at least four additional holes for
  allowing said guide rods to pass;
at least two stop members wherein said stop members
  comprise a cap with a hole in the top of each of said
  stop members; and
at least two springs.

12. The chuck system for a weld tool of claim 11 wherein said at least two stop members are sized so that said springs can fit in said stop members.

13. The chuck system for a weld tool of claim 12 wherein said springs are sized to fit over said load rods.

14. The chuck system for a weld tool of claim 13 wherein said hole in said top of said stop members is sized for said load rods to extend through said stop members.

15. The chuck system for a weld tool of claim 14 wherein said load rods are threaded rods that are configured to screw into said a second and third hole in said back of said base member for receiving said two load rods and are configured to extend through said brace plate through said two additional holes for allowing said load rods to pass through.

16. The chuck system for a weld tool of claim 15 wherein said guide rods are threaded at one end of said guide rods and configured to screw into said fourth, fifth, sixth, and seventh hole in said back of said base member for receiving said four guide rods and are configured to extend through said brace plate through said at least said four additional holes for allowing said guide rods to pass.

17. The chuck system for a weld tool of claim 15 further comprising at least two nuts wherein said two nuts are configured to screw on said at least two load rods.

18. The chuck system for a weld tool of claim 15 wherein said brace plate further comprises at least twelve additional holes for providing a location to mount said brace plate to a weld tool.

19. The chuck system for a weld tool of claim 18 wherein said brace plate further comprises at least four additional holes for providing clearance for items mounted to said weld tool.

* * * * *